US012747024B2

(12) United States Patent
Schafer et al.

(10) Patent No.: US 12,747,024 B2
(45) Date of Patent: Sep. 29, 2026

(54) MECHANICAL DE-ICING SYSTEM

(71) Applicants: Textron Aviation Inc., Wichita, KS (US); Textron Innovations Inc., Providence, RI (US)

(72) Inventors: Steven Ryan Schafer, Wichita, KS (US); Gonzalo Eduardo Mendoza, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 40 days.

(21) Appl. No.: 18/537,746

(22) Filed: Dec. 12, 2023

(65) Prior Publication Data

US 2024/0199215 A1 Jun. 20, 2024

Related U.S. Application Data

(60) Provisional application No. 63/387,319, filed on Dec. 14, 2022.

(51) Int. Cl.
*B64D 15/16* (2006.01)

(52) U.S. Cl.
CPC .................................... *B64D 15/16* (2013.01)

(58) Field of Classification Search
CPC ................................ B64D 15/16; B64D 15/20
See application file for complete search history.

(56) References Cited

U.S. PATENT DOCUMENTS

| | | | | | |
|---|---|---|---|---|---|
| 2,271,466 | A * | 1/1942 | Schmidt | B64D 15/16 244/134 A |
| 2,297,951 | A * | 10/1942 | Frank | B64D 15/16 244/134 A |
| 4,706,911 | A | 11/1987 | Briscoe et al. | |
| 4,826,108 | A | 5/1989 | Briscoe et al. | |
| 5,022,612 | A | 6/1991 | Berson | |
| 5,356,096 | A | 10/1994 | Rauckhorst, III et al. | |
| 5,547,150 | A | 8/1996 | Adams et al. | |
| 5,686,003 | A | 11/1997 | Ingram et al. | |
| 6,007,894 | A * | 12/1999 | Barnes | B29C 70/30 156/184 |
| 6,102,333 | A | 8/2000 | Gerardi et al. | |
| 9,067,685 | B2 | 6/2015 | Delrieu | |
| 9,327,839 | B2 | 5/2016 | Giles et al. | |
| 9,598,167 | B2 | 3/2017 | Grip et al. | |
| 9,889,940 | B2 | 2/2018 | Lenkey | |
| 10,377,497 | B2 | 8/2019 | Ishida et al. | |
| 10,427,798 | B2 | 10/2019 | Snir et al. | |

* cited by examiner

*Primary Examiner* — Richard Green
*Assistant Examiner* — Nevena Aleksic
(74) *Attorney, Agent, or Firm* — Avek IP, LLC

(57) ABSTRACT

A de-icing system for an airfoil includes a flexible skin having one or more stiffening elements embedded therein and one or more actuators positioned within the airfoil and configured to engage an impact area of the flexible skin with a displacement force. The stiffening elements extend substantially parallel to the leading edge of an airfoil and are placed in a chordwise succession proceeding away from the leading edge of the airfoil. The one or more stiffening elements are configured to transmit the displacement force to a non-impact area of the flexible skin adjacent to or near the one or more stiffening elements. The displacement force causes an outer surface of the flexible skin adjacent to the impact area to be distorted and an outer surface of the flexible skin of the non-impact area to be distorted.

12 Claims, 8 Drawing Sheets

MECHANICAL DE-ICING SYSTEM

CROSS-REFERENCE TO RELATED APPLICATIONS

This application claims the benefit of priority of U.S. Provisional Patent Application No. 63/387,319, filed on Dec. 14, 2022, the disclosure of which is herein incorporated by reference in its entirety.

BACKGROUND

1. Field

Embodiments of the invention relate generally to aircraft de-icing, and more specifically to mechanical de-icing of airfoils.

2. Related Art

Buildup of snow, ice or frost on exterior surfaces of aircraft wings affect aircraft functions, including interference with various flight operations. Deicing processes and procedures enable an aircraft to safely and efficiently function by removing such buildup. Previous mechanisms of de-icing aircraft surfaces, and specifically wings or airfoil surfaces, comprise a myriad of methods and systems, including mechanical means such as actuators and vibrational devices, thermal means such as heating elements and heat redirection, and pneumatic means in which the expansion and compression of fluids break up ice accretion on airfoils. The use of such systems can, at times, require intensive maintenance of complex systems and effect decreased engine efficiency.

Various solutions have been proposed for preventing or removing ice from airfoil surfaces. For example, U.S. Pat. No. 4,706,911 to Briscoe et al. discloses mechanical de-icing systems with flexible airfoil skins. U.S. Pat. No. 5,356,096 to Rauckhorst III et al. discloses flexible airfoil skins with a stiffener backing layer. U.S. Pat. No. 9,598,167 to Grip et al. discloses a system that mechanically displaces the shape of a flexible edge skin on an airfoil.

U.S. Pat. No. 5,547,150 to Adams et al. discloses an airfoil deicer comprising a means of deflection beneath a segmented shell. U.S. Pat. No. 9,067,685 to Delrieu discloses an electromechanical de-icing system having a shield of non-uniform stiffness. U.S. Pat. No. 5,686,003 to Ingram et al. discloses a deicing system that includes shape memory alloy materials.

U.S. Pat. No. 9,327,839 to Giles et al. discloses an aircraft deicer in which actuators introduce a three-dimensional displacement to the surface.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

The embodiments described herein relate to a de-icing system of an airfoil that includes a flexible skin formed from a single layer of one or more materials and is coupled to a structural skin of an aircraft wing. One or more stiffening rods are embedded in the flexible skin and extend substantially parallel to a leading edge of the airfoil and in chordwise succession proceeding away from the leading edge of the airfoil. One or more actuators are positioned within the airfoil to engage an impact area of the flexible skin for providing a displacement force. One or both of the of an inner surface of the flexible skin and the one or more actuators may have one or more protrusions extending therefrom that include an impact area. The impact area is generally an area where the actuators impact an inner surface of the flexible skin or the one or more protrusions extending from the flexible skin or the one or more stiffening rods that causes a linear distortion of the flexible skin. Such linear distortion may be approximately perpendicular to the one or more stiffening rods that are substantially parallel to the leading edge of the airfoil. In one embodiment, the linear distortion engages all of the one or more stiffening rods. The displacement force causes an outer surface of the flexible skin adjacent to the linear distortion of the impact area to be distorted. The one or more stiffening elements transmit the displacement force to a non-impact area of the flexible skin such that an outer surface of the flexible skin of the non-impact area is distorted. The non-impact area includes areas adjacent to or near the one or more stiffening elements, but not adjacent to or near the impact area. In general, the non-impact area is an area that is not directly impacted by the one or more actuators. In an embodiment, the de-icing system includes a means of preventing jamming, binding, and excessive friction between the one or more actuators and the impact area. The distortion of the flexible skin causes accreted ice to de-bond from the flexible skin and be carried away from the aircraft by an airstream.

BRIEF DESCRIPTION OF THE DRAWING FIGURES

Embodiments of the invention are described in detail below with reference to the attached drawing figures, wherein.

Figure 1:
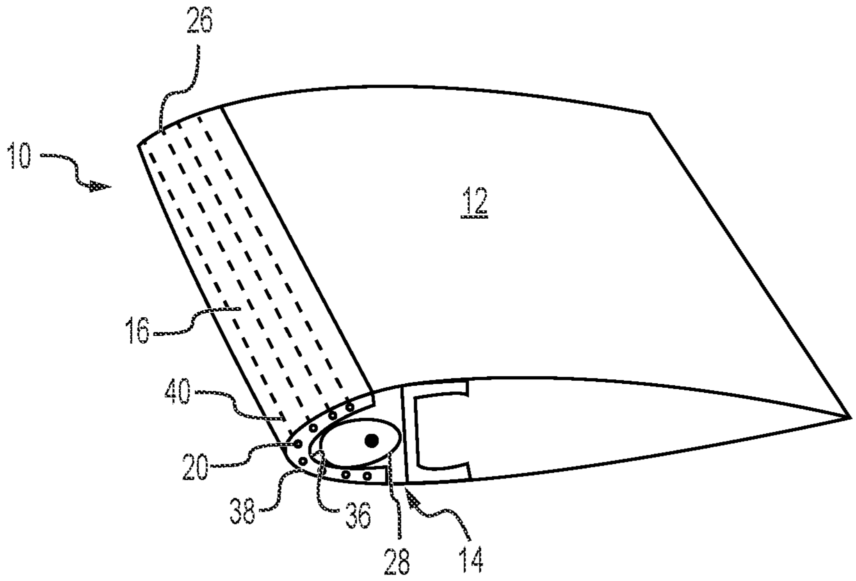
FIG. 1 illustrates a cross-sectional view of an airfoil having a mechanical de-icing system with a rotary actuator, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

The present system aims to remedy the drawbacks of the previous mechanisms of de-icing and relates to a mechanical de-icing system that can be used for de-icing aircraft surfaces, including airfoil surfaces such as wings, fins, propellers, struts, tails, and stabilizers, and particularly the leading edges of such surfaces. The de-icing system 10 de-bonds and expels ice without relying on resistive heating elements, pneumatic boots, or bleed air, and instead employs simple mechanical means to mechanically de-ice an aircraft surface. The benefits of the present invention include the ability to tune the frequency and magnitude of surface displacements that effect de-icing of the surface, design the system to most efficiently locate the actuators to minimize the number of actuators needed to effect de-icing, decrease weight and energy requirements of the de-icing system, and increase life and reliability of the de-icing system due to decreased complexity and maintenance requirements.

Embodiments disclosed herein include a de-icing system 10 for an airfoil 12. In one embodiment, the de-icing system 10 includes a single layer flexible skin 16 on the airfoil 12 and an actuator 14 within the airfoil 12 that serves to dislodge accreted ice 18 on the flexible skin 16 of the airfoil 12. The flexible skin 16 of the de-icing system 10 includes discrete stiffening elements 20, that may include rods or other stiffening structures, which can transmit displacement forces of the actuator 14. The actuator 14 produces a motion directly to an impact area, and the discrete stiffening elements 20 transmit the displacement forces that are a result of the motion to non-impact areas of the flexible skin 16 or areas that are removed from the impact area of the actuator 14. The motion of the actuator 14 may include a sliding motion, a rolling motion, or a combined motion across the flexible skin 16 and/or the stiffening elements 20. The discrete stiffening elements 20 enable actuators 14 to de-ice the airfoil 12 with a minimal number of actuators 14. The actuators 14 provide displacement forces that de-bond accreted ice 18 on the flexible skin 16, with the ice 18 then being carried away from the aircraft by the airstream. The frequency of actuation for the configurations discussed below of the de-icing system 10 could be dynamically controlled or tuned based upon parameters processed in a controller for the de-icing system 10, the parameters including current atmospheric conditions or measurements, aircraft states such as speed, altitude, landing gear position or high lift device configuration, and ice measurements on the airfoil 12 detected by an ice detection system. The de-icing system 10 may be used in conjunction with known systems that detect the accretion of ice 18 on the airfoils 12, but it may also be used independent of such a system and be scheduled or activated by a controller to operate at periodic or nonperiodic intervals or be activated by a user.

Figure 2:
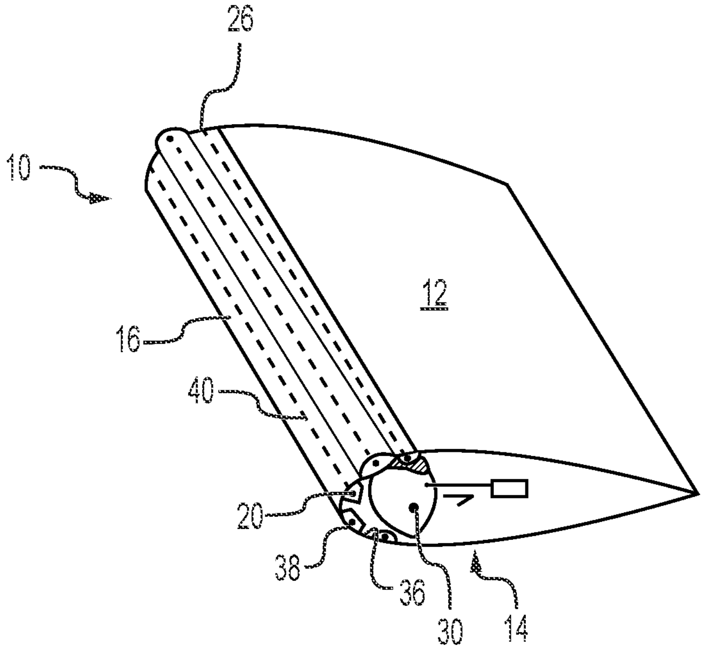
FIG. 2 illustrates a cross-sectional view of an airfoil having a mechanical deicing system with a linear actuator, in an embodiment.

FIGS. 1 and 2 show the airfoil 12, including the flexible skin 16 with discrete stiffening elements 20 extending spanwise along the leading edge 26 of the airfoil 12. The actuator 14 is located within the airfoil 12. The actuator 14 may be a rotary actuator 28 (FIG. 1) or a linear actuator 30 (FIG. 2). The displacement forces produced by the actuator 14 cause the flexible skin 16, and the discrete stiffening elements 20 that may be embedded within the flexible skin 16, to transmit displacement forces from the actuator 14 to the flexible skin 16. The discrete stiffening elements 20 minimize the number of actuators 14 needed for effective de-icing of the leading edge 26 of the airfoil 12.

In one embodiment the flexible skin 16 may be attached to and supported by a conventional skin or substrate layer or structural skin 31 that may provide structural support, and/or carry or transmit loads into surrounding components. The structural skin 31 may be located under some or parts of the flexible skin 16. In the embodiment shown in FIG. 14 the flexible skin 16 includes a bond 34, permanently bonding the flexible skin 16 to the structural skin 31 at edges 33. This embodiment may include slots or areas 32 in the structural skin 31 through which the actuator 14 is able to contact the flexible skin 16, directly or indirectly, to transmit displacement forces to the flexible skin 16. The structural skin 31 may include a recess or be offset such that flexible skin 16 lies flush with the rest of the wing surface, maintaining aerodynamic form.

In one embodiment, the flexible skin 16 is a single layer of one or more materials and has discrete stiffening elements 20 embedded in the flexible skin 16 along the leading edge 26 of the airfoil 12. The flexible skin 16 may have elastic qualities that include the ability of the material of the flexible skin 16 to return to its rest state within a short period of time after a displacement force or other imposed force is removed. The flexible skin 16 may have an inner surface 36 that is capable of being deflected or distorted sufficient to displace accreted ice 18 on the outer surface 38 of the flexible skin 16. Typically, to effect de-icing the displacement of the outer surface 38 of the flexible skin 16 causes a sufficient change in the leading edge 26 of the airfoil 12 thereby debonding and cracking accreted ice 18 accumulating on the leading edge 26. Ideally, the flexible skin 16 may be a high strength, elastic, distortable material with fatigue resistant properties to withstand the cyclical deflections or distortions and displacement forces of the de-icing system 10, stresses associated with aerodynamic loads and changes in temperature, and other known factors that may affect the fatigue properties of the flexible skin 16. The layer of flexible skin 16 may include one or a combination of materials, including rubbers, latexes, silicones, thin metals, fabrics, or other foreseeable materials. The determination of the appropriate materials may take into consideration properties of the materials or factors that may include the required debonding stress of ice on the layer of material, the required displacement of the layer required to generate that local stress, fatigue life of the material and the coefficient of thermal expansion of the material. These factors may be variable depending upon thickness of the ice, anticipated ice growth rate and actuation rate. In addition, cost and ease of access to the material or materials play a role in determining the material used for the flexible skin 16.

The discrete stiffening elements 20 may have similar characteristics to those discussed above with regard to the flexible skin 16. The discrete stiffening elements 20 may be designed and spaced apart or tuned to provide a calculated deflection pattern when impacted by the displacement forces of the actuator 14 and an optimal displacement of the outer surface 38 of the flexible skin 16 for de-icing. The discrete stiffening elements 20 may be rods 40 or other known stiffening elements, or a combination thereof. In one embodiment the discrete stiffening elements 20 are embedded in the flexible skin 16 and run spanwise or substantially parallel to the leading edge 26 and extend up to the entire span of the airfoil 12. The discrete stiffening elements 20 may be placed in chordwise succession proceeding away from the leading edge 26. The discrete stiffening elements 20 transmit the displacement forces from the actuator 14. The displacement forces are initially applied at an impact area or discrete point along the airfoil 12 and are transmitted to non-impact areas extending approximately the span of the discrete stiffening elements 20 along the leading edge 26 of the airfoil 12. The discrete stiffening elements 20 may be designed to compensate for the distance the displacement force travels from the impact area. Factors of the discrete stiffening elements 20 that may affect de-icing of the flexible skin 16 include density of the discrete stiffening elements 20 in the leading edge 26 of the airfoil 12 (how close the discrete stiffening elements 20 are to each other), spanwise and chordwise positioning of the discrete stiffening elements 20 and actuators 14, and relative stiffness of the discrete stiffening elements 20 to the surrounding flexible skin 16.

In one embodiment, the discrete stiffening elements 20 are stiffening rods 40 that transmit the displacement forces of the actuators 14. Actuators 14, located at positions along the span of the wing or within and between the inboard and outboard sections of the leading edge 26, press or push into the inner surface 36 of the flexible skin 16 with sufficient force that distortions are created at impact areas or localized points and along the stiffening rods 40. The dynamic between the flexible skin 16 and the stiffening rods 40 creates displacements on the outer surface 38 of the flexible skin 16 near the impact area adjacent to the actuator 14 and on the outer surface of the flexible skin 16 near non-impact areas that are areas adjacent or near adjacent to the stiffening rods 40, but not adjacent to the actuators 14. Along a linearly varying leading edge, the stiffening rods 40 may transmit the displacement forces to sections of the flexible skin 16 such that the number of actuators 14 needed to effect de-icing may be minimized. It is foreseeable that the flexible skin 16 with discrete stiffening elements 20 could be used with a variety of mechanical deflection systems.

In some embodiments, the discrete stiffening elements 20 may be supported by structural standoffs, e.g., rib sections or pseudo-rib standoffs (not shown), to provide structure and additional stiffness to the discrete stiffening elements 20, the flexible skin 16, or a combination thereof. The ribs may be formed of metal such as aluminum, wood, plastic, fiber reinforced plastic materials such as epoxy impregnated glass or graphite fabrics, composites, foam, or other materials known in the art. In embodiments shown in FIGS. 14, 15 and 16, the stiffening elements 20 and the flexible skin 16 may be joined or bonded to a structural or load bearing skin 31 in the airfoil 12. In one embodiment, the flexible skin 16 and the stiffening elements 20 may extend over and cover the structural skin 31 in the leading edge 26, and actuators 14 may extend through the slots 32 in the structural skin 31 to actuate or displace, directly or indirectly, the inner surface 36 of the flexible skin 16 and the stiffening elements 20. The actuators 14 may also extend through slots 32 in the flexible skin 16 to directly displace the stiffening elements 20. The strength, stiffness, flexibility, and ability to transmit the displacement forces of the discrete stiffening elements 20, flexible skin 16, or a combination thereof, may be varied depending on design factors of the de-icing system 10, including the flexibility of the flexible skin 16, the spanwise length of the airfoil 12, the curvature of the airfoil 12, and other factors that would be known to a person skilled in the art.

In a preferred embodiment, the actuator or actuators 14 used for displacement of the flexible skin 16 may be positioned within the airfoil 12 to drive the distortion of the inner surface 36 of the flexible skin 16 to dislodge accreted ice 18 on the outer surface 38 of the flexible skin 16. Embodiments of the actuator 14 of the de-icing system 10 are described below. In one embodiment, the actuator 14 may be a mechanical actuator. In one embodiment, the actuator 14 may be an electromechanical actuator. The actuator 14 drives displacement forces to create a linear distortion of the inner surface 36 of the flexible skin 16 which effects displacement of the outer surface 38 of the flexible skin 16. The displacement of the outer surface 38 of the flexible skin 16 is extended to areas not adjacent to the impact area of the actuator 14 via the discrete stiffening elements 20. Depending on the complexity of the airfoil 12, a simple flat-wrapped wing may only need two actuators 14, one at the root section and one at the tip section, to displace the flexible skin 16 of the entire leading edge 26. A more complex wing will likely require discrete placement of actuators 14 at various spanwise locations.

Figure 3:
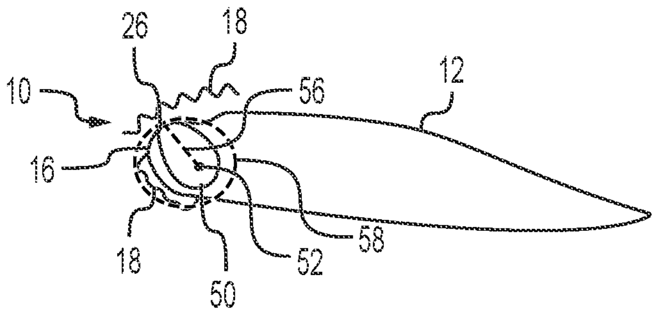
FIG. 3 illustrates a cross-sectional view of the airfoil in FIG. 1, having an eccentric cam with an offset center, in an embodiment.
Figure 14:
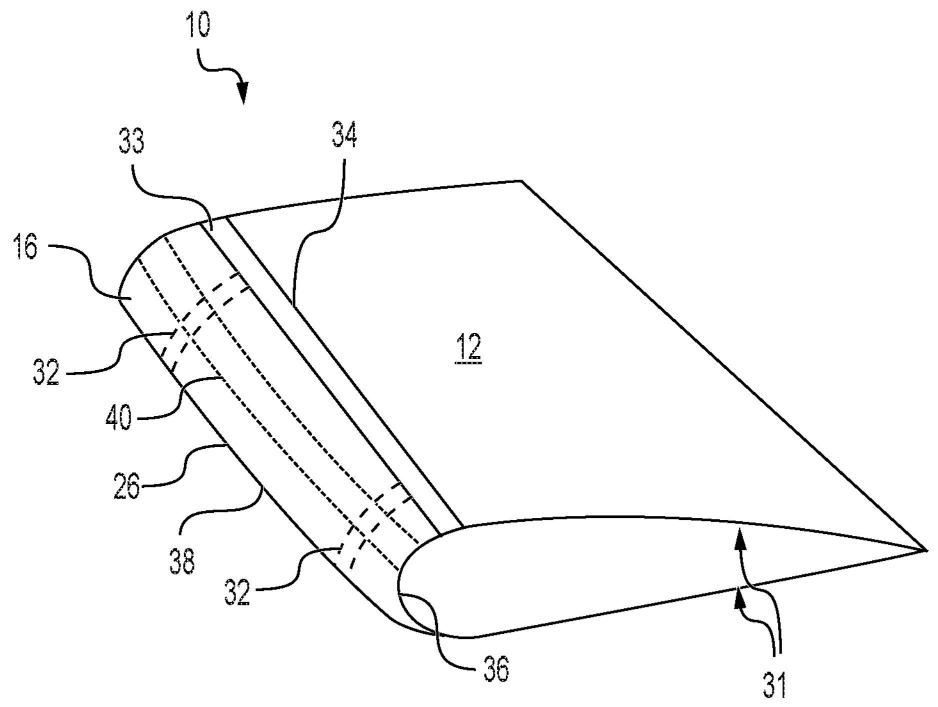
FIG. 14 illustrates a cross-sectional view of the airfoil in FIG. 1, with slots in a structural skin and a bond for bonding of flexible skin to the structural skin, in an embodiment.
Figure 15:
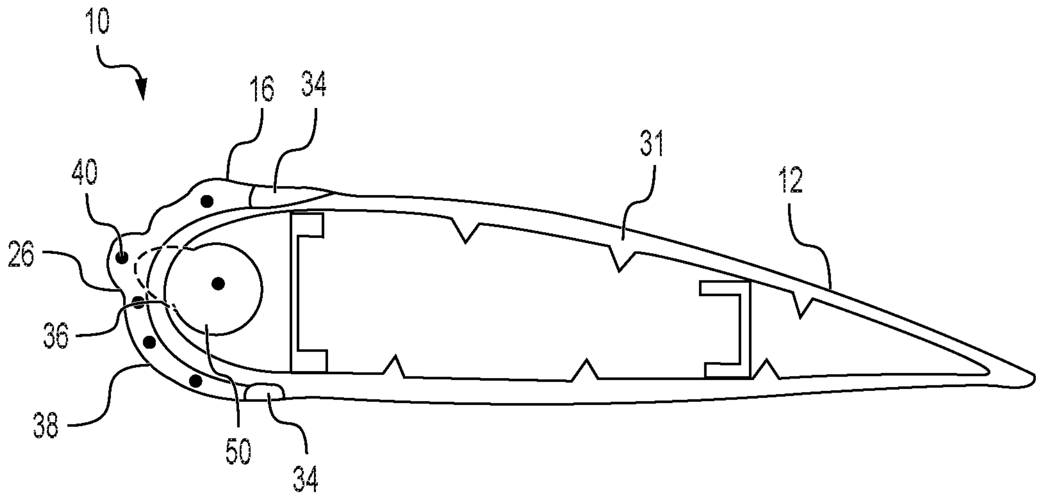
FIG. 15 illustrates a cross-sectional view of the airfoil in FIG. 1 with details of the structural skin, in an embodiment.
Figure 16:
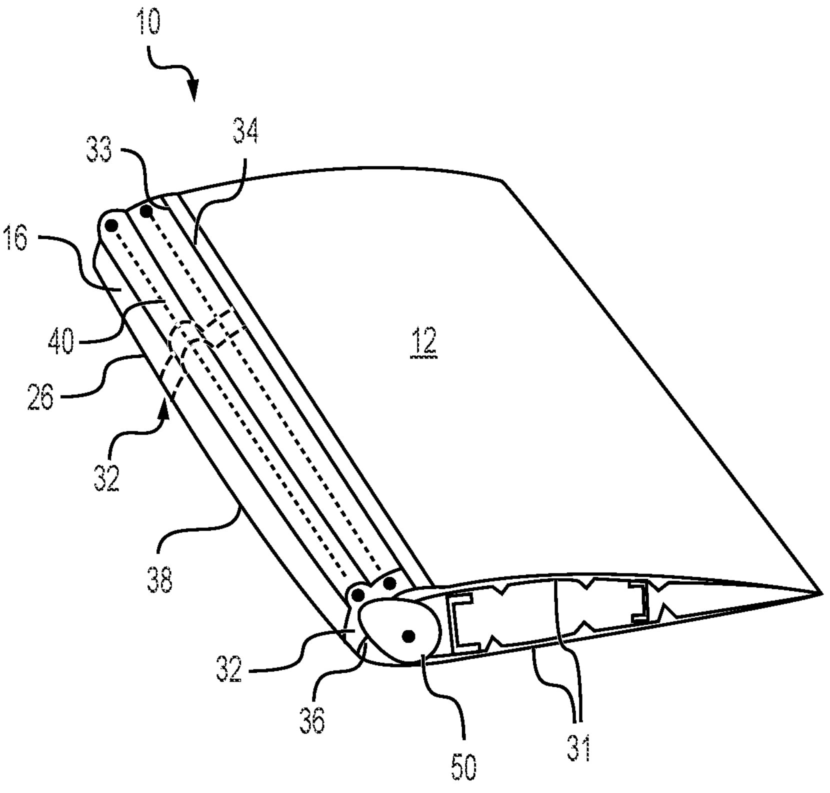
FIG. 16 illustrates a cross-sectional view of the airfoil in FIG. 1, with an eccentric cam and slots in a structural skin, in an embodiment.

In some embodiments, one or more rotating rollers or eccentric cams 50 engage the inner surface 36 of the flexible skin 16 at discrete spanwise locations along the leading edge 26 of the airfoil 12. The eccentric cams 50 may be of any spanwise length within the span of the airfoil. Referring now to FIG. 3, it is shown that in one embodiment the actuator 14 is an actuator 14 that includes the eccentric cam 50 having an offset center 52 which is fixed to a rotating axle of the actuator 14. The eccentric cam 50 includes a protrusion that rotates with a force sufficient to distort the inner surface 36 of the flexible skin 16. Components and/or lubrication, further described below, may be utilized to prevent jamming or excessive friction in this embodiment. FIG. 3 illustrates a radial dimension of a distal portion of the greatest radial dimension 56 of the eccentric cam 50 greater than the distance between the rotating axle and the inner surface 36 of the flexible skin 16. FIG. 3 illustrates that when the eccentric cam 50 rotates the distal portion of the greatest radial dimension 56 of the eccentric cam 50 protrudes into the flexible skin 16 and causes the distortion and displacement of the flexible skin 16 dislodging the accreted ice 18 on the outer surface 38 of the flexible skin 16. The path of the distal portion of the greatest radial dimension 56 is a distal path 58. FIGS. 14, 15 and 16 illustrate the location of the slots 32 in the structural skin 31 through which the eccentric cams 50 may extend to distort the flexible skin 16. In FIG. 16, the distal path 58 of the cams 50 lie at spanwise locations corresponding with the slots 32 in the structural skin 31 that permit the cams 50 to actuate out of the contour of the structural skin 31, displacing the flexible skin 16. The stiffening rods 20 transmit the displacement forces or deflection of the flexible skin 16 from each cam 50 to the rest of the flexible skin or layer 16 which may lie over the structural skin 31.

Figure 4:
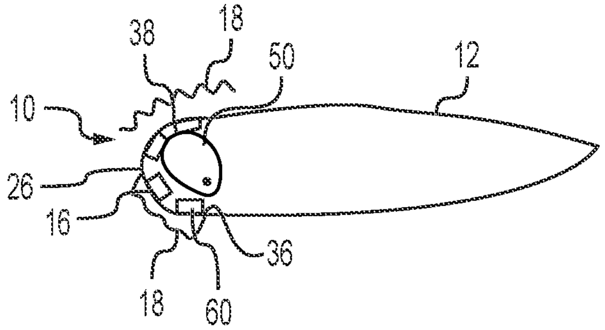
FIG. 4 illustrates a cross-sectional view of the airfoil in FIG. 1, having an eccentric cam with an offset center and bumps extending inward from the flexible skin, in an embodiment.
Figure 5:
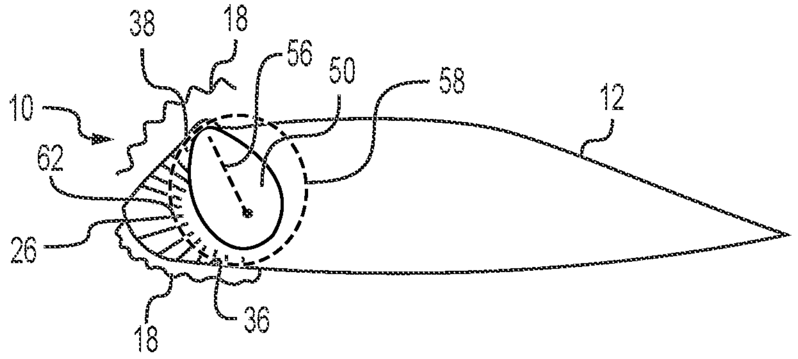
FIG. 5 illustrates a cross-sectional view of the airfoil in FIG. 1, having an eccentric cam with an offset center and rods extending inward from the flexible skin, in an embodiment.

Referring now to FIGS. 4 and 5, in some embodiments a series of protrusions, including bumps 60 or rod members 62, extending inward from the inner surface 36 of the flexible skin 16 on the leading edge 26 of the airfoil 12 may intersect or lie within the distal path 58 of the actuators 14, including the rotating rollers and eccentric cams 50 discussed above, and the flexible skin 16 may be distorted and displaced when the actuators 14 intersect the bumps 60 or rod members 62. In one embodiment, the bumps 60 or rod members 62 may be located within the one or more guides or slots 32 aligned with the distal path 58 of the actuators 14. The bumps 60 or rod members 62 function as an extension of the inner surface 36 of the flexible skin 16 and the impact of the displacement forces of the actuator 14 on the bumps 60 or rod members 62 distorts and displaces the flexible skin 16. The displacement of the outer surface 38 of the flexible skin 16 depends upon the extent that the bumps 60 or rod members 62 extend into the distal path 58 of the actuators 14 and the degree to which the displacement is transmitted to the outer surface 38 of the flexible skin 16. The degree to which the displacement is transmitted to the outer surface 38 of the flexible skin 16 depends on the characteristics of the bumps 60 or rod members 62 relative to the flexible skin 16. The displacement of the flexible skin 16 can be tuned such that different surface displacements can be generated at different chordwise locations, spanwise locations, or a combination thereof, for example by adjusting how far the bumps 60 or rod members 62 extend into the distal path 58 of the actuators 14 at discrete locations.

Figure 17:
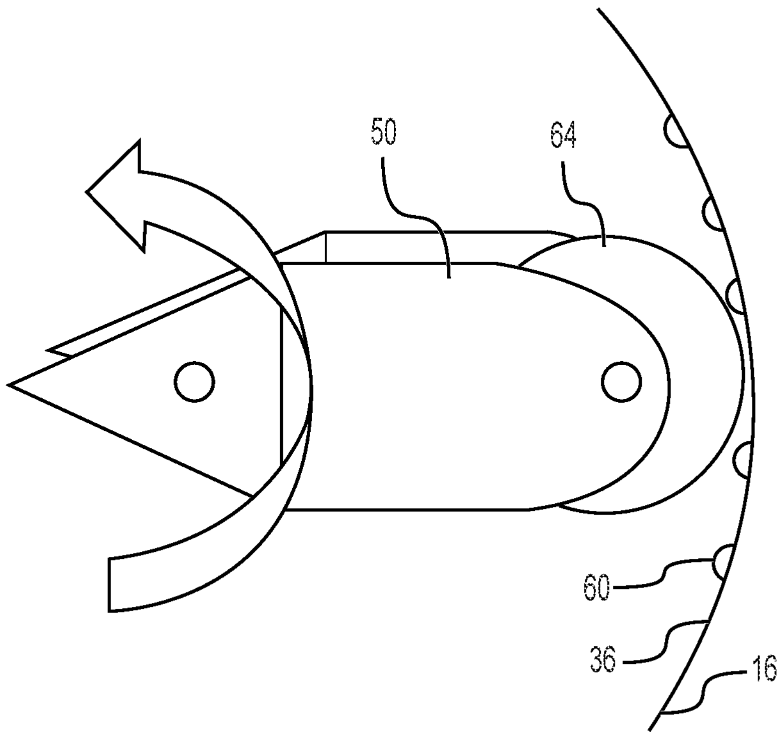
FIG. 17 illustrates a view of an eccentric cam in FIG. 1, with a component to prevent jamming and/or excessive friction, in an embodiment.

The bumps 60 extending inward from the inner surface 36 of the flexible skin 16 or extending inward from the guides may be of any variety or combination of three-dimensional shapes contemplated by one skilled in the art to effect de-icing. The bumps 60 or rod members 62 may be formed from any variety or combination of materials that have the necessary mechanical and physical properties to transfer the displacement forces, such materials known to one skilled in the art. In one embodiment the bumps 60 or rod members 62 extending from the inner surface 36 of the flexible skin 16 may include lubrication and/or components (not shown) at contact locations with the rotating roller or eccentric cam 50 to prevent jamming, binding, or excessive friction of the actuator 14 with the flexible skin 16 and/or with the stiffening elements 20. Lubrication may be utilized along the contact path of the actuator 14 and the flexible skin 16 or stiffening rod 20. For example, such paths may be sealed, or may be self-lubricating or spray lubricated. The components may include rollers or ball bearings, which may be sealed, or other components that may be contemplated by one skilled in the art. As shown in FIG. 17, the components to prevent jamming or excessive friction 64 may additionally or alternatively be located on the actuators 14, including the rotating roller or eccentric cam 50.

Some components may be self-lubricating, and other components may require lubrication, such as oil or grease, to reduce wear, reduce stress, reduce friction and/or other foreseeable benefits from lubrication. The type and application of the lubricant may be based on parameters including operating temperature, lubricant viscosity, speed factor, and load ratio.

Figure 6:
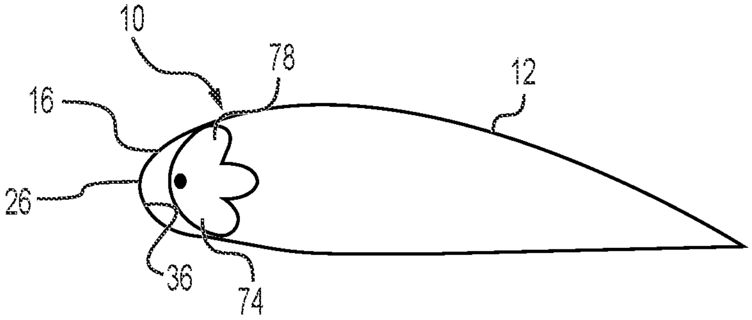
FIG. 6 illustrates a cross-sectional view of the airfoil in FIG. 1, having an irregularly shaped roller, in an embodiment.
Figure 7:
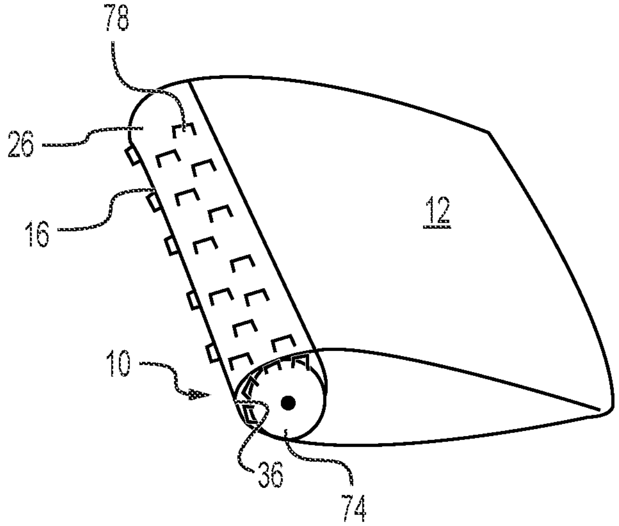
FIG. 7 illustrates a cross-sectional view of the airfoil in FIG. 1, having an irregularly shaped roller, in an embodiment.
Figure 8:
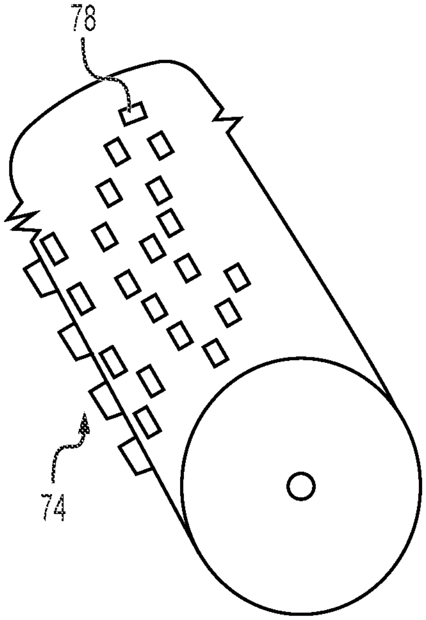
FIG. 8 illustrates a perspective view of the irregularly shaped roller of FIG. 7.
Figure 18:
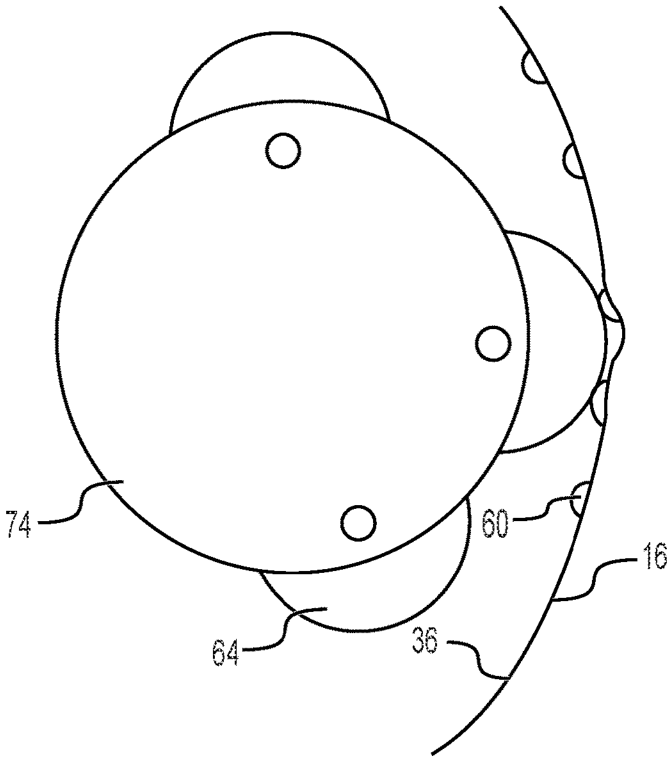
FIG. 18 illustrates a view of a roller in FIG. 1, with components to prevent jamming and/or excessive friction, in an embodiment.
Figure 19:
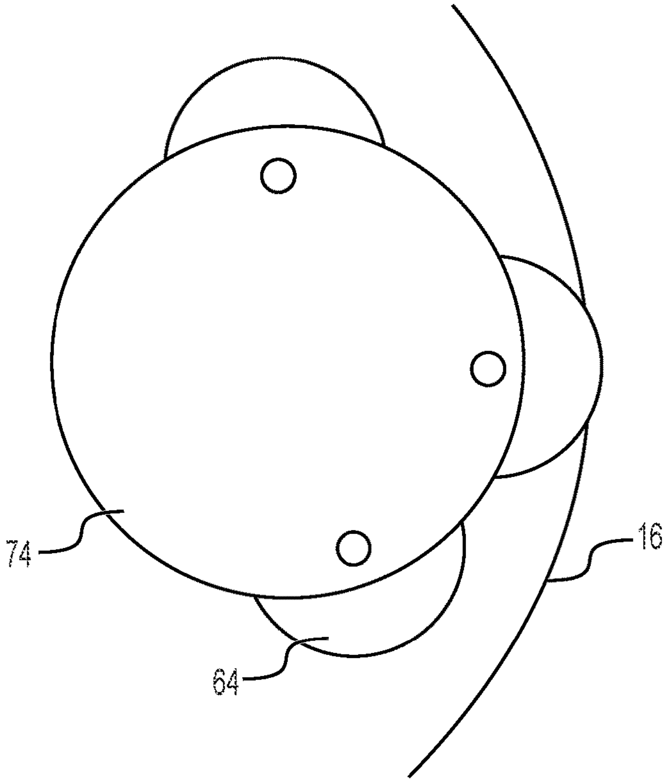
FIG. 19 illustrates a view of a roller in FIG. 1, with components to prevent jamming and/or excessive friction, in an embodiment.

In the embodiments shown in FIGS. 6, 7, and 8, the shape of the actuator 14 may be an irregularly shaped roller or a roller 74 designed to create contact with the inner surface 36 of the flexible skin 16 at periodic intervals during one rotation of the roller 74. The irregularly shaped roller 74 may have a distribution of multiple strikers or protrusions or sections of greater radial dimension 78 which contact the inner surface 36 of the flexible skin 16 or the bumps 60 or rod members 62 extending from the inner surface 36 of the flexible skin 16 at a predetermined frequency or at discreet chordwise and spanwise locations. The magnitude, location, and frequency of the displacement of the flexible skin 16 or the bumps 60 or rod members 62 may be tuned to provide optimal conditions for de-icing. The aforementioned components 64 and/or lubrication to prevent jamming or excessive friction may be located on one or both of the actuator 14, including the strikers, and the inner surface 36 of the flexible skin 16 or the bumps 60 or rod members 62 extending therefrom. FIGS. 18 and 19 illustrate embodiments of the components 64 rotatably extending from the roller 74 and contacting the bumps 60 extending from the inner surface 36 of the flexible skin 16 and the flexible skin 16, respectively.

In one embodiment, when the de-icing system 10 is not operating the roller 74 is designed to allow the flexible skin 16 to lie flush in its given aerodynamic shape. In an embodiment, the roller 74 has a smooth section that interfaces with the flexible skin 16 that allows the flexible skin 16 to remain in its flush aerodynamic shape when the de-icing system 10 is not functioning. In an embodiment, the roller 74 may be repositioned in a slightly recessed configuration when the de-icing system 10 is not in operation, thus preventing contact between the irregular features of the roller 74 and the flexible skin 16 to allow the flexible skin 16 to remain in its flush aerodynamic shape. A person skilled in the art may contemplate other solutions to allow the flexible skin 16 to lie flat or flush in its given aerodynamic shape when the de-icing system 10 is not functioning.

Figure 9:
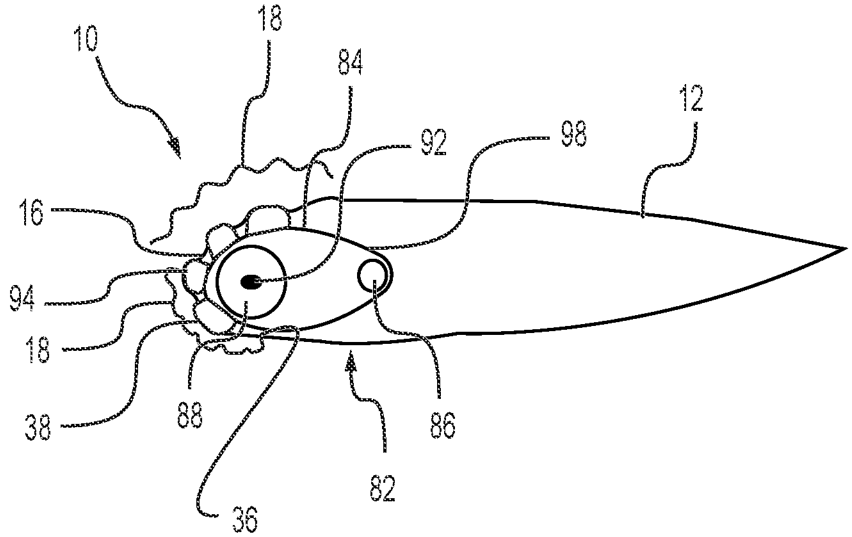
FIG. 9 illustrates a cross-sectional view of an airfoil having a belt drive with a series of bumps on a belt, in an embodiment.

In an embodiment shown in FIG. 9, the actuator 14 may include a belt drive 82. In one embodiment the belt drive 82 comprises a driving pulley or gear or driver 86 driving the belt 84 and a driven pulley or gear or roller 88 being driven by the belt 84. The belt 84 may be driven, contacting and distorting the flexible skin 16, by the belt drive 82. The roller 88 may rotate about a center hub 92 and be located such that the belt 84 distorts the flexible skin 16. The belt 84 may have a series of protrusions or bumps 94 which protrude or extend outward from the belt 84 toward the inner surface 36 of the flexible skin 16 to distort the flexible skin 16 and generate a displacement pattern on the outer surface 38 of the flexible skin 16 to dislodge accreted ice 18 on the outer surface 38 of the flexible skin 16. The bumps 94 may be designed or tuned, for example by engineering the location, size, and shape of the bumps 94, to generate deflections at discreet positions along the leading edge 26 of the airfoil 12, both spanwise and chordwise. The distribution of the bumps 94 on the belt 84 may be arbitrary but designed in view of the required magnitude and frequency of distortions or displacements on the flexible skin 16 required to effect de-icing of the airfoil 12 and the individual design requirements for each airfoil 12. As described above, components and/or lubrication may be utilized to prevent jamming or excessive friction in this embodiment.

In one embodiment, when the de-icing system 10 is not operating, the belt 84 is designed to allow the flexible skin 16 to lie flush in its given aerodynamic shape. In one embodiment, the belt 84 has a smooth section 98 without bumps 94 that interfaces with the flexible skin 16 when the de-icing system 10 is not functioning. A person skilled in the art may contemplate other solutions to allow the flexible skin 16 to lie flat or flush in its given aerodynamic shape when the de-icing system 10 is not functioning.

Figure 10:
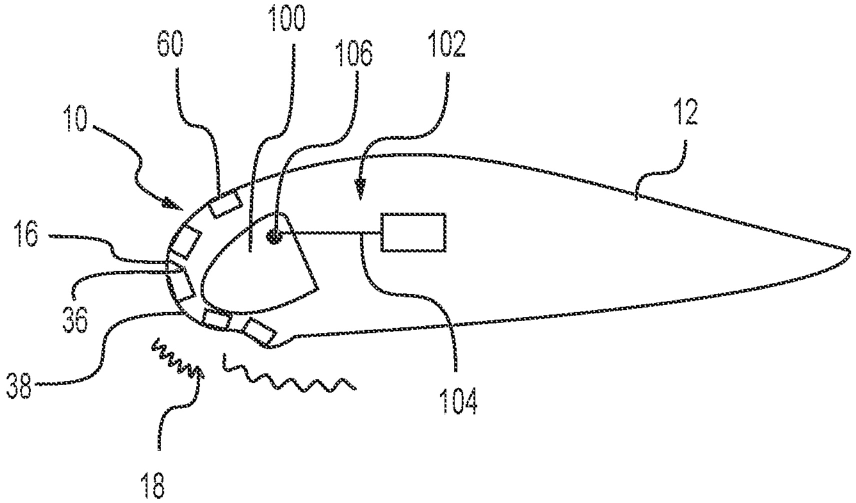
FIG. 10 illustrates a cross-sectional view of the airfoil in FIG. 2, with a linked cam having an offset hinge, in an embodiment.

As shown in the embodiment in FIG. 10, the actuator 14 is a linear actuator 102, including a linked cam 100 driven in a track by a link arm 104 that is rotatably hinged to the linked cam 100 at an offset hinge location 106 offset from the center point of the linked cam 100 to cause a protrusion of the linked cam 100 to rock or oscillate against the inner surface 36 of the flexible skin 16 when actuated. This embodiment is similar to that of a bell crank as known in the art but operates to generate a motion of the linked cam 100 along the desired path. This mechanism is also similar to the rotating roller or eccentric cam 50, but the linked cam 100 in this case is configured for limited rotation or limited oscillation. The de-icing system 10, including the shape and size of the linked cam 100, the offset hinge location 106 and the direction, force, and location of the actuator 14, may be configured to effectively displace the flexible skin 16 to dislodge accreted ice 18 on the surface of the flexible skin 16. In one embodiment, the linked cam 100 may engage protrusions, such as bumps 60 or rod members 62 extending inwardly from the inner surface 36 of the flexible skin 16. In one embodiment, the linked cam 100 may be an irregularly shaped roller and have a distribution of multiple strikers or protrusions or multiple sections of greater radial dimension (as discussed above with regard to rotating roller and eccentric cam 50) designed to displace the flexible skin 16 at a desired magnitude, frequency, location, or combination, thereof. The above embodiments may also be utilized with components and/or lubrication to prevent jamming, as previously described.

Figure 11:
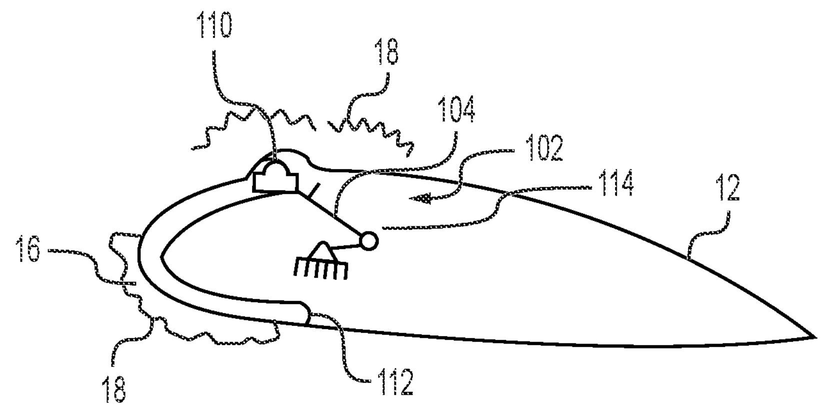
FIG. 11 illustrates a cross-sectional view of an airfoil having a linear actuator with one agitator, in an embodiment.
Figure 12:
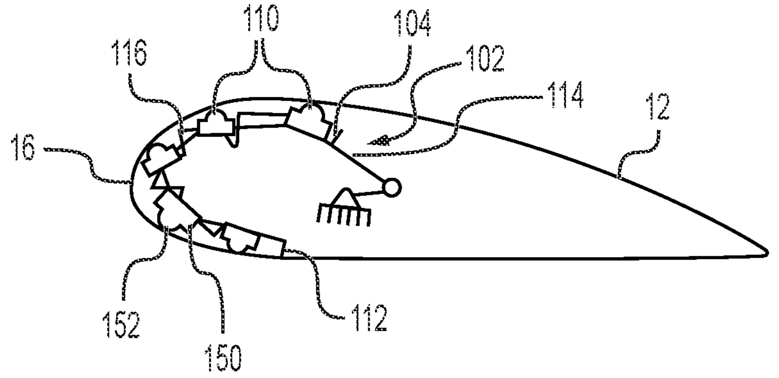
FIG. 12 illustrates a cross-sectional view of the airfoil in FIG. 11, with a series of agitators, in an embodiment.
Figure 13:
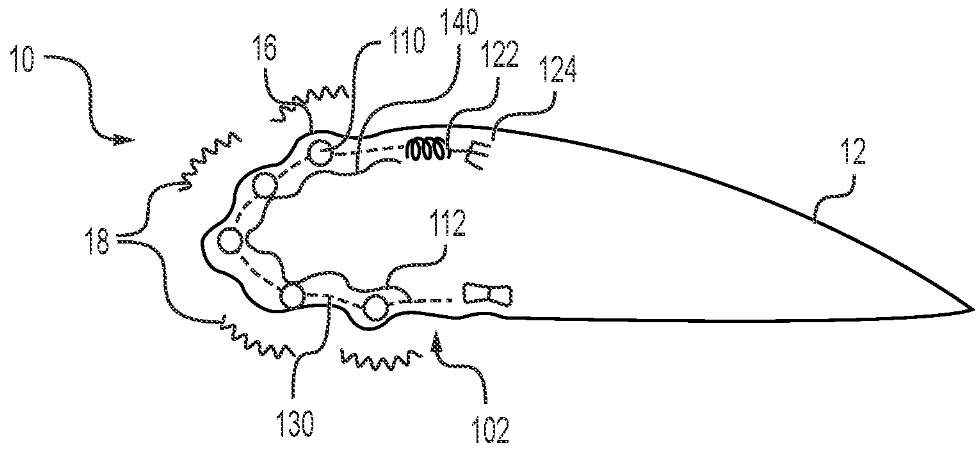
FIG. 13 illustrates a cross-sectional view of the airfoil in FIG. 11, with a series of agitators and a restoring spring providing positive tension on the series of agitators, in an embodiment.

In an embodiment shown in FIGS. 11 and 12, the linear actuator 102 may include a series of one or more agitators 110 within a series track 112 and a link arm 104 joined to a first end 114 of the series of one or more agitators. The agitators 110 may be joined in the series by mechanical links 116 and spaced apart a distance such that effective de-icing is achieved. In one embodiment, the mechanical links 116 are rigid links. In an embodiment in FIG. 13, when a restoring spring 122 at a second end 124 of the series provides a positive tension on the series of agitators 110, non-rigid links 130 such as a chain may be used to link and space the agitators 110 apart. In one embodiment, in the case when the de-icing system 10 is not functioning, the restoring force of the restoring spring 122 pulls the series of agitators 110 into a neutral position within discreet wells 140 located in the series track 112 such that the flexible skin 16 of the airfoil 12 is not distorted when the de-icing system 10 is not in use and the agitators 110 do not adversely affect the aerodynamic shape of the airfoil 12 when the de-icing system 10 is not active.

The agitators 110 are formed to effect distortion of the flexible skin 16 during de-icing and fit within the agitator series track 112 of the de-icing system 10. The agitators 110 are formed to protrude and distort the flexible skin 16 when the linear actuator 102 produces a motion. The agitators 110 may have a base 150 with a shaped protrusion 152 extending toward the flexible skin 16. The shaped protrusion 152 may be formed in shapes ranging from one or more spherical caps, pyramids, cones, truncated protrusions, other shapes that may be contemplated by one skilled in the art, or a combination thereof. The shape, size, and dimension of the series of agitators 110 are designed to optimally distort the flexible skin 16 for de-icing.

As previously described, components and/or lubrication may be utilized between the agitators 110 and the flexible skin 16 to prevent jamming or excessive friction in the above embodiments.

Although the invention has been described with reference to the embodiments illustrated in the attached drawing figures, it is noted that equivalents may be employed and substitutions made herein without departing from the scope of the invention as recited in the claims.

What is claimed is:

1. A de-icing system of an airfoil, the de-icing system comprising:

a flexible skin coupled to a structural skin wherein the structural skin is offset from the flexible skin such that the flexible skin lies flush with a surface of the airfoil thus maintaining aerodynamic form;

one or more actuators positioned within the airfoil, wherein the one or more actuators directly engage an impact area for providing a displacement force; and a plurality of stiffening elements coupled to the flexible skin, the stiffening elements extending substantially parallel to a leading edge of the airfoil and placed in chordwise succession proceeding away from the leading edge of the airfoil, the stiffening elements configured to transmit the displacement force to a non-impact area of the flexible skin adjacent to or near the stiffening elements, wherein the stiffening elements are secured to the flexible skin and transmit the displacement force when the one or more actuators are rotated relative to the stiffening elements and directly contact the stiffening elements or the flexible skin at the impact area;

wherein the displacement force causes an outer surface of the flexible skin adjacent the impact area to be distorted and an outer surface of the flexible skin of the non-impact area to be distorted.

2. The de-icing system of claim 1, wherein the de-icing system is configured such that when the de-icing system is not functioning, the flexible skin is not distorted.

3. The de-icing system of claim 1, comprising a bond, wherein the bond permanently bonds the flexible skin to the structural skin at edges.

4. The de-icing system of claim 3, wherein the structural skin includes one or more slots through which the one or more actuators can engage the impact area.

5. The de-icing system of claim 1, wherein the stiffening elements are rods.

6. The de-icing system of claim 1, wherein the one or more actuators include one or more rotary actuators.

7. The de-icing system of claim 1, wherein the one or more actuators include one or more eccentric cams having an offset center, wherein a distal path of the one or more eccentric cams causes the one or more eccentric cams to engage the impact area with the displacement force.

8. The de-icing system of claim 1, wherein the flexible skin includes one more protrusions extending radially inward therefrom that form the impact area.

9. The de-icing system of claim 1, wherein the one or more actuators include one or more irregularly shaped rollers having one or more protrusions extending therefrom.

10. The de-icing system of claim 1, wherein the one or more actuators include one or more belt drives each comprising a belt that is drivable to engage the impact area with the displacement force, wherein the belt includes one or more protrusions extending therefrom.

11. The de-icing system of claim 1, wherein the one or more actuators include one or more linear actuators.

12. The de-icing system of claim 11, wherein the one or more linear actuators are linked to one or more agitators joined by mechanical links and positioned within a track such that the one or more agitators engage the impact area with the displacement force.

* * * * *